(No Model.)
G. H. SAWYER.
DISK HARROW.
No. 379,287. Patented Mar. 13, 1888.
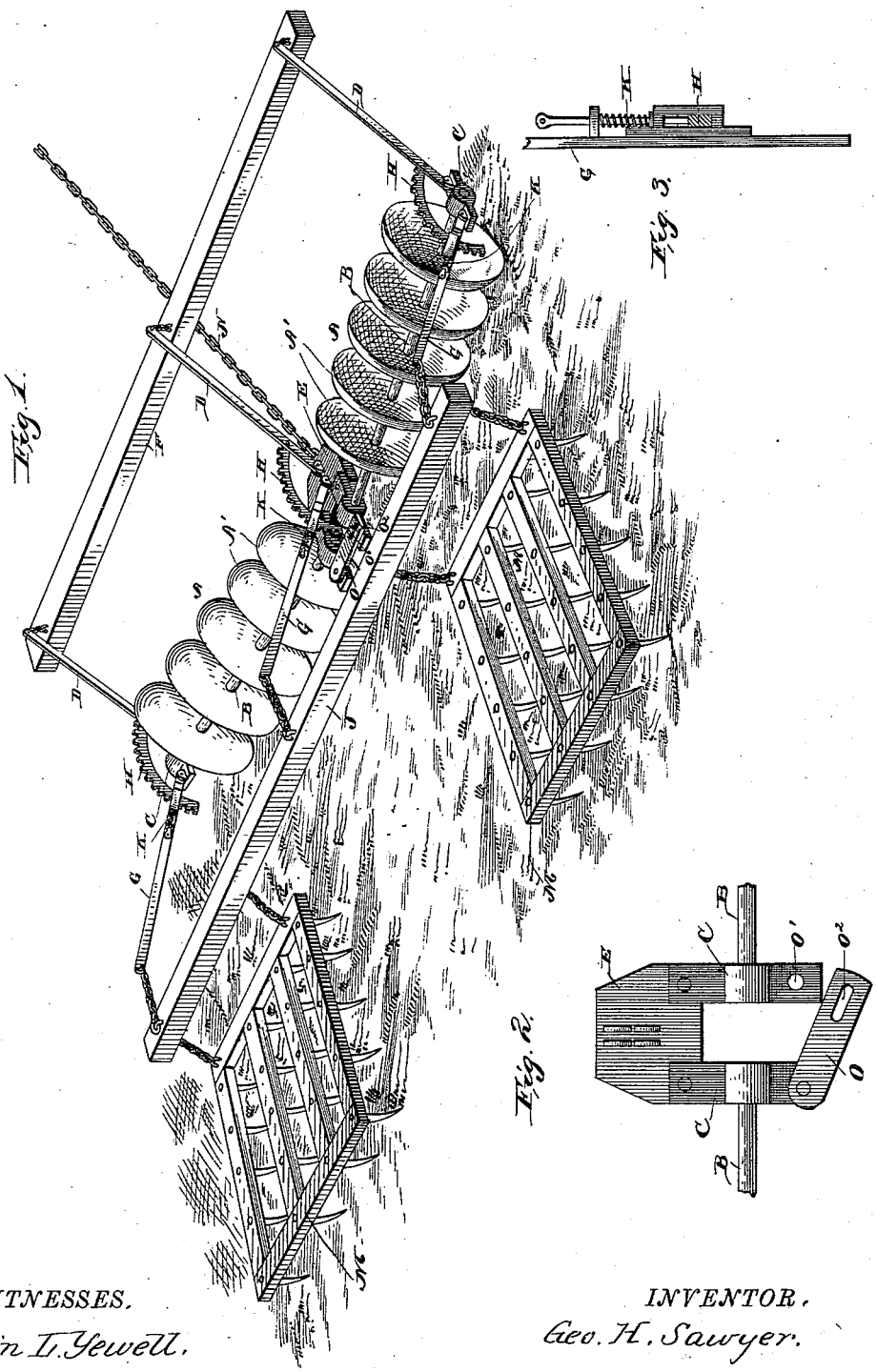
WITNESSES.
Edwin L. Yewell.
Chas. Helm.
INVENTOR.
Geo. H. Sawyer.
By Manahan & Ward.
Attorneys.

UNITED STATES PATENT OFFICE.

GEORGE H. SAWYER, OF LAMOILLE, ILLINOIS.

DISK HARROW.

SPECIFICATION forming part of Letters Patent No. 379,287, dated March 13, 1888.

Application filed December 1, 1887. Serial No. 256,716. (No model.)

*To all whom it may concern:*

Be it known that I, GEORGE H. SAWYER, a citizen of the United States, residing at Lamoille, in the county of Bureau and State of Illinois, have invented certain new and useful Improvements in Disk Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to disk harrows, and pertains more especially to mechanism for regulating the depth of the cut of the disks thereof, and utilizing, as a mode of such regulation, a following spike-tooth harrow or other pulverizer. As is well known to those conversant with the use of the disk harrow, the earth is left by the latter somewhat in large clumps, which can be readily reduced and pulverized if the operation follows immediately after the passage of the disk harrow and before such clods have had time to become dry and hardened.

In my invention, which I have submitted to the practical test of one season's use, I regulate the depth of the cut of the disks without varying the weight of the parts or changing the direction of the disk-gangs, and at the same time, and without increasing the draft, follow said disks with a harrow or pulverizer.

In the drawings, Figure 1 is a perspective of a machine embodying my invention. Fig. 2 is a detail of the interior ends of the disk-gangs and the mode in which they are seated; Fig. 3, a detail view.

A A are the usual disk-gangs, consisting of any number of disks, A', seated, in any of the usual modes, on the common axle B. Each end of each axle B is suitably journaled in the box C. On the front side of each outer end of the box C is pivotally seated a bar, D, extending forward and upward from the disk-gangs.

The box C, at the inner end of each gang of disks, is pivoted separately at its forward end to a forwardly-extending underlying shoe, E, and to the front end of the shoe I pivotally attach the rear end of the bar D, corresponding to those at the outer ends of the gangs.

F is a horizontal draw-bar attached in any suitable way (preferably by small chains) to the front ends of the bar D.

In a mode substantially like that of the attachment of the bars D are pivoted to the end boxes, C, and the shoe E rearwardly and upwardly extending arms or levers G, to the rear ends of which, by chains or otherwise, is attached the draw-bar J of an ordinary spike-tooth harrow or other pulverizer, the latter being connected in any suitable way to the last-named draw-bar.

The mode of regulating the depth of cut of the disks A' is by raising and lowering the draw-bar F. The higher such bar is carried the deeper will be the entrance of the disks, and vice versa. The height of the draw-bar F is regulated by causing the bars D to approach or recede from the rear bars, G, and this is accomplished by pivoting the forward end of the connecting curved bars H to the bar D, and providing the upper surface of the bar H with the ordinary ratchet adapted to be engaged by the ordinary spring-pawl, K, seated on the levers G.

It is not essential that more than one of each pair of arms D and G shall be pivotally seated, as the pivot action of the other can be obtained through the axle B.

M is an ordinary harrow or pulverizer, the peculiar form and construction of which is immaterial.

The inner box, C, of each gang of disks is separately pivoted at its forward end to the shoe E, in order to afford means for changing the direction of the disk-gangs, and the latter are varied in their direction to the line of movement by a chain or bar, A, attached at its rear end to the shoe E, and adjustably at its forward end to the whiffletree or other suitable point.

In order to hold the adjacent ends of the disk-gangs A at a uniform altitude, I pivot on the rear end of one of the interior boxes, C, a short arm, O, and form in the other end of the arm O a vertical longitudinal slot, $O^2$, through which is passed vertically the bolt O' into the rear side of the interior box, C, of the adjacent disk-gang A. The slot $O^2$ permits the lateral oscillation of the disk-gangs for the purpose of changing the direction of the cut of the same, while the arm O holds the adjacent ends of the gangs in the same horizontal plane.

By changing the distance between the bars D and levers G the depth of the cut of the disks A' can be regulated as desired without reference to the obliquity of cut of said disks.

In my invention I dispense with the weight of the driver as a means of holding down the disks and substitute therefor the draft of the harrow, which latter involves less labor for the team, and at the same time accomplishes an additional useful result, and is adjustable, as aforesaid.

What I claim as my invention, and desire to secure by Letters Patent of the United States, is—

1. In combination with the disk-gangs A, the divergent bars D and G, having their inner ends seated at or near the axis of said disk-gangs, and adjustable connecting-bars H, substantially as shown, and for the purpose described.

2. In a disk harrow, the combination of the draft-bars D, projected forward from the axis of the disk-gangs, the rearward-extending bars G, pivoted at their forward ends at or near the axis of said disk-gangs, a harrow or other pulverizer attached to the rear end of the bars G, and intermediate mechanism, H, for varying the distance between the bars D and G, substantially as shown, and for the purpose described.

3. In a disk harrow, and as means of regulating the depth of cut thereof, forwardly-extending draft-arms D, pivotally seated at or near the axis of said disk-gangs, rearwardly-extending bars G, pivoted likewise at their forward ends, a harrow or other pulverizer attached to the rear ends of the bars G, and means, substantially as shown, for adjustably connecting bars D and G, for the purpose described.

4. In combination with the disk-gangs A, the shoe E, interior boxes, C, pivotally seated, respectively, on the shoe E, and the connecting-arm O, pivotally seated upon one of said boxes and adjustably connected to the other thereof, substantially as shown, and for the purpose described.

5. In a disk harrow, and as a means of regulating the depth of cut thereof, upwardly and forwardly extending draft-arms D, seated at their rear ends at or near the axis of the disk-gangs, rearwardly and upwardly extending arms G, seated at their forward ends at or near said axis, (one or the other of said arms being pivotally seated at the point aforesaid,) means for varying the distance between said arms, and a weight or drag applied to the outer ends of the arms G, substantially as shown, and for the purpose described.

In testimony whereof I affix my signature in presence of two witnesses.

GEO. H. SAWYER.

Witnesses:
JOHN F. BARRETT,
GEO. W. PACKER.